United States Patent
Kim et al.

(10) Patent No.: US 10,017,173 B2
(45) Date of Patent: Jul. 10, 2018

(54) APPARATUS AND METHOD FOR CONTROLLING TORQUE INTERVENTION OF HYBRID VEHICLE

(71) Applicant: HYUNDAI MOTOR COMPANY, Seoul (KR)

(72) Inventors: Sang Joon Kim, Seoul (KR); Gwang Il Du, Incheon (KR); Teh Hwan Cho, Anseong-si (KR); Ji Hoon Kang, Seoul (KR); Seong Ik Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/375,769

(22) Filed: Dec. 12, 2016

(65) Prior Publication Data

US 2018/0065619 A1 Mar. 8, 2018

(30) Foreign Application Priority Data

Sep. 5, 2016 (KR) .......................... 10-2016-0114121

(51) Int. Cl.
*B60W 20/13* (2016.01)
*B60W 10/06* (2006.01)
*B60W 10/08* (2006.01)

(52) U.S. Cl.
CPC ............ *B60W 20/13* (2016.01); *B60W 10/06* (2013.01); *B60W 10/08* (2013.01); *B60W 2510/244* (2013.01); *B60W 2710/0666* (2013.01); *B60W 2710/083* (2013.01)

(58) Field of Classification Search
CPC ....... B60W 20/13; B60W 10/06; B60W 10/08
See application file for complete search history.

(56) References Cited

U.S. PATENT DOCUMENTS

| 2014/0309079 | A1* | 10/2014 | Tabata | B60K 6/547 |
| | | | | 477/5 |
| 2015/0151736 | A1 | 6/2015 | Kim | |
| 2016/0107634 | A1* | 4/2016 | Kim | B60W 10/06 |
| | | | | 701/22 |

FOREIGN PATENT DOCUMENTS

| JP | 2006-144589 A | 6/2006 |
| JP | 4244519 B2 | 3/2009 |
| JP | 2013-163434 A | 8/2013 |
| KR | 10-1490954 B1 | 2/2015 |

(Continued)

OTHER PUBLICATIONS

Korean Notice of Allowance issued in corresponding Korean Patent Application No. 10-2016-0114121, dated Dec. 22, 2017.

*Primary Examiner* — Basil T. Jos
(74) *Attorney, Agent, or Firm* — McDermott Will & Emery LLP

(57) ABSTRACT

An apparatus for controlling a torque intervention of a hybrid vehicle includes a driving information detector for detecting a torque intervention request of the hybrid vehicle, and a controller for deriving a target motor torque and a target engine torque depending on a required torque variation when the torque intervention is requested, the target motor torque being derived so that a high voltage battery does not deviate from a state of charge (SOC) charging and discharging limit, the target motor torque limiting the target engine torque to be equal to or less than a target engine torque before the intervention request to obtain a final engine torque, and the target motor torque correcting the target motor torque to a final motor torque depending on the final engine torque.

14 Claims, 7 Drawing Sheets

(56) References Cited

FOREIGN PATENT DOCUMENTS

| KR | 10-1500245 | B1 | 3/2015 |
| KR | 10-1566755 | B1 | 11/2015 |
| KR | 10-2016-0045496 | A | 4/2016 |

\* cited by examiner

APPARATUS AND METHOD FOR CONTROLLING TORQUE INTERVENTION OF HYBRID VEHICLE

CROSS REFERENCE TO RELATED APPLICATION

The present application claims the benefit of priority to Korean Patent Application No. 10-2016-0114121, filed on Sep. 5, 2016 with the Korean Intellectual Property Office, the entire contents of which are incorporated herein for all purposes by this reference.

TECHNICAL FIELD

The present disclosure relates to an apparatus and a method for controlling a torque intervention of a hybrid vehicle, and more particularly, to an apparatus and a method capable of stably maintaining state of charge (SOC) balancing of a battery while operating an engine at an optimal operating point when performing a traction control system (TCS) torque intervention for wheel slip prevention.

BACKGROUND

A hybrid vehicle indicates a vehicle driven by an efficient combination of at least two different kinds of power sources. Hybrid vehicles often indicate vehicles driven by an engine that generates a torque by combusting fuel and a motor that generates a torque by electric energy of a battery.

The hybrid vehicle may have various power transfer structures using the engine and the motor and some hybrid vehicles adopt one of a parallel type power transfer structure or a serial type power transfer structure.

Further, the hybrid vehicle may generate an optimal output torque depending on how to concurrently operate the engine and the motor while the hybrid vehicle is driven by two power sources including the engine and the motor.

A typical powertrain arrangement of the hybrid vehicle is a type in which an engine clutch is installed between the engine and the motor and has a structure in which an engine, a starting generator for engine starting and power generation, an engine clutch interposed between the engine and the motor, a motor (driving motor), and a transmission are sequentially arranged. Further, the motor and the starting generator are connected to the battery through an inverter to be chargeable and dischargeable.

Meanwhile, in a hybrid vehicle in which an automatic transmission is mounted, a shift time may be shortened by an optimal slip control of a clutch and a brake using a fluid (transmission oil) during a shift and a sense of difference, or a large shift, occurring at the time of the shifting is minimized.

Further, to reduce a shock generated when the clutch within the transmission during the shift is engaged or disengaged, a torque intervention control is performed to instantaneously reduce a transmission input torque.

In a typical automatic transmission hybrid vehicle, a torque control target for reducing the transmission input torque when the torque intervention is requested is the engine and the motor and to reduce the transmission input torque, a control to reduce an engine torque itself or reduce the transmission input torque while the engine operation torque is transferred to the motor to perform a power generation operation of the motor (absorb an engine output by charging the battery) has been performed.

FIG. 1 is a diagram illustrating a control instruction to perform a torque intervention according to the related art. As illustrated in FIG. 1, if the intervention is requested, a torque reduction amount is calculated and a motor charging available amount is calculated to output a motor torque and an engine torque.

In more detail, when a maximum torque (here, the torque means a torque absolute value and the torque upon the power generation is an actual negative torque) of the motor for a power generation operation or a maximum torque (negative torque, maximum generation possible torque) of the motor considering a state of charge (SOC) of the battery is equal to or more than 'abs ((engine target RPM−engine current RPM)×engine inertia)+abs (engine operation torque−intervention requested torque)', the engine is controlled by the engine operation torque of an instruction value before the intervention without reducing the torque Here, 'abs ( )' represents an absolute value.

In this case, the motor for the power generation operation performs the torque control based on the value of the 'abs ((engine target RPM−engine current RPM)×engine inertia)+abs (engine operation torque intervention requested torque)'.

If the maximum torque of the motor for the power generation operation, the maximum torque of the motor considering the state of charge (SOC) of the battery, or the like is smaller than the 'abs ((engine target RPM−engine current RPM)×engine inertia)+abs (engine operation torque−intervention requested torque)', the intervention requested torque control for reducing the output torque depending on an intervention yoke value by a control of ignition timing is performed on the engine. In this case, a zero torque control is performed on the motor.

However, the existing shift control scheme is a scheme of delaying the ignition timing while supplying and consuming fuel during the engine torque control for the torque intervention and reduces the engine torque to reduce engine efficiency (causing a reduction in fuel efficiency).

In addition, a hybrid vehicle having two motors has been developed recently. In the hybrid vehicle, the strategies of the torque intervention control and the driving source control that may minimize an energy loss and maximize drivability upon the switching of a series-parallel mode or the parallel shift control have not yet been proposed.

SUMMARY

An object of the present disclosure is to provide an apparatus and a method for controlling a torque intervention of a hybrid vehicle capable of stably maintaining SOC balancing of a battery while operating an engine at an optimal operating point in performing a traction control system (TCS) torque intervention for wheel slip prevention when a road surface is in a slippery state.

According to an exemplary embodiment of the present disclosure, there is provided an apparatus for controlling a torque intervention of a hybrid vehicle, including: a driving information detector configured to detect a torque intervention request of the hybrid vehicle; and a controller configured to derive a target motor torque and a target engine torque depending on a required torque variation when the torque intervention is requested, the target motor torque being derived so that a high voltage battery does not deviate from an SOC charging and discharging limit, the target motor torque limiting the target engine torque to be equal to or less than a target engine torque before the intervention request to obtain a final engine torque, and the target motor torque correcting the target motor torque to a final motor torque depending on the final engine torque.

The controller may limit the SOC charging and discharging limit of the high voltage battery to be a first set torque when the SOC of the high voltage battery is equal to or less than a first reference value and limit the SOC charging and discharging limit to be a second set torque when the SOC of the high voltage battery is equal to or more than a second reference value.

The controller may calculate a difference of a torque variation from the target motor torque before the intervention to derive the target motor torque, in a calculation of the target motor torque depending on the SOC charging and discharging limit of the high voltage battery.

The torque variation may be a difference value of a transmission input torque from an intervention requested torque.

The controller may obtain the target engine torque by calculating a difference of the target motor torque from an intervention requested torque.

The final motor torque may be obtained by calculating a difference of the final engine torque from a sum of the target motor torque and the target engine torque.

The controller may limit the final motor torque to be within a range from a minimum output motor torque to a maximum output motor torque.

According to another exemplary embodiment of the present disclosure, there is provided a method for controlling the apparatus for controlling a torque intervention of a hybrid vehicle, including: detecting a torque intervention request of the hybrid vehicle; deriving a target motor torque and a target engine torque depending on a required torque variation when the torque intervention is requested, the target motor torque being derived so that a high voltage battery does not deviate from an SOC charging and discharging limit; obtaining a final engine torque by limiting the target engine torque to be equal to or less than the target engine torque before the intervention request; and correcting the target motor torque to a final motor torque depending on the final engine torque.

The controller may limit the SOC charging and discharging limit of the high voltage battery to be a first set torque when the SOC of the high voltage battery is equal to or less than a first reference value and limit the SOC charging and discharging limit to be a second set torque when the SOC of the high voltage battery is equal to or more than a second reference value.

The controller may calculate a difference of a torque variation from the target motor torque before the intervention to derive the target motor torque, in a calculation of the target motor torque depending on the SOC charging and discharging limit of the high voltage battery.

The torque variation may be a difference value of a transmission input torque from an intervention requested torque.

The controller may obtain the target engine torque by calculating a difference of the target motor torque from an intervention requested torque.

The final motor torque may be obtained by calculating a difference of the final engine torque from a sum of the target motor torque and the target engine torque.

The controller may limit the final motor torque to be within a range from a minimum output motor torque to a maximum output motor torque.

DETAILED DESCRIPTION

The present disclosure may be variously modified and have a plurality of exemplary embodiments. Therefore, specific exemplary embodiments of the present disclosure will be illustrated in the accompanying drawings and be described in detail in the present specification. However, it is to be understood that the present disclosure is not limited to the disclosed exemplary embodiments, but includes all modifications, equivalents and substitutions included in the spirit and the scope of the present disclosure.

Further, when it is determined that the detailed description of the known art related to the present disclosure may obscure the concepts of the present disclosure, the detailed description thereof will be omitted. Further, numerals (for example, first, second etc.) used in describing the present specification are only an identification symbol for differentiating one component from other components.

Further, in the present specification, it is to be understood that when one component is referred to as "connected" to another component, one component may be directly connected to another component or may be connected to another component through other component interposed therebetween unless explicitly described to the contrary.

Hereinafter, exemplary embodiments of the present disclosure will be described with reference to the accompanying drawings.

Figure 1:
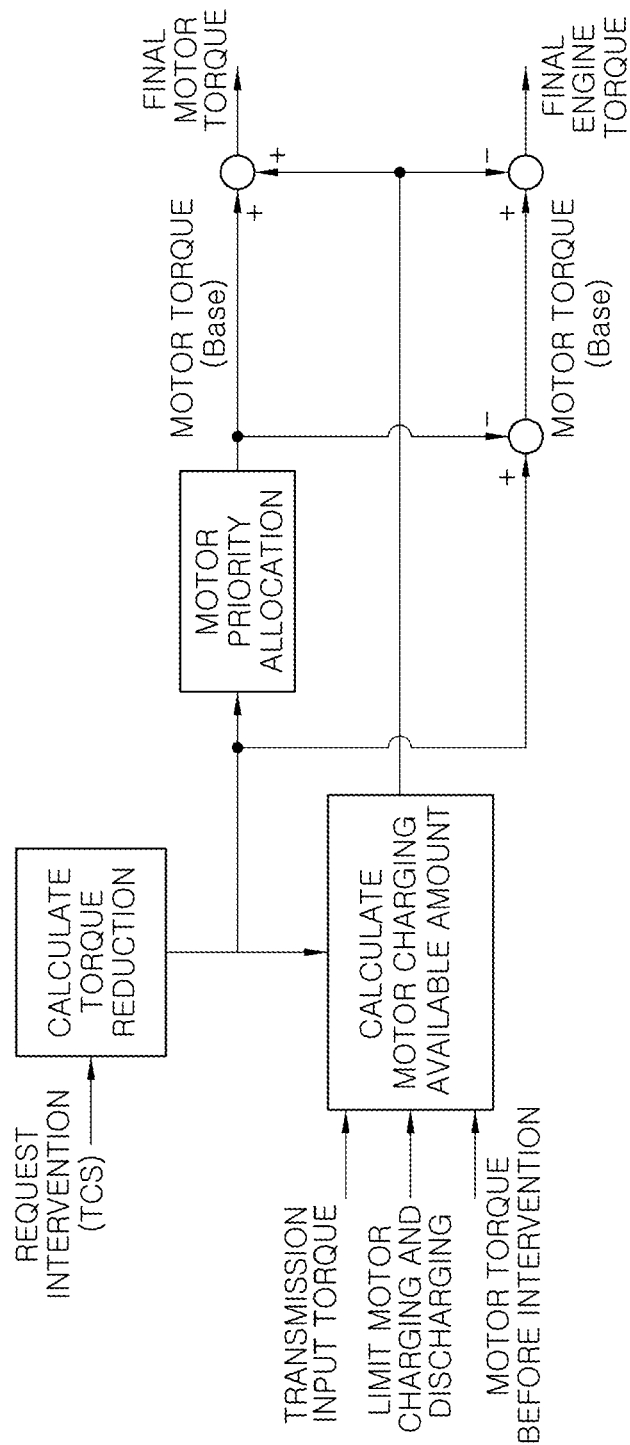
FIG. 1 is a schematic diagram illustrating a control instruction to perform a torque intervention according to the related art.
Figure 2:
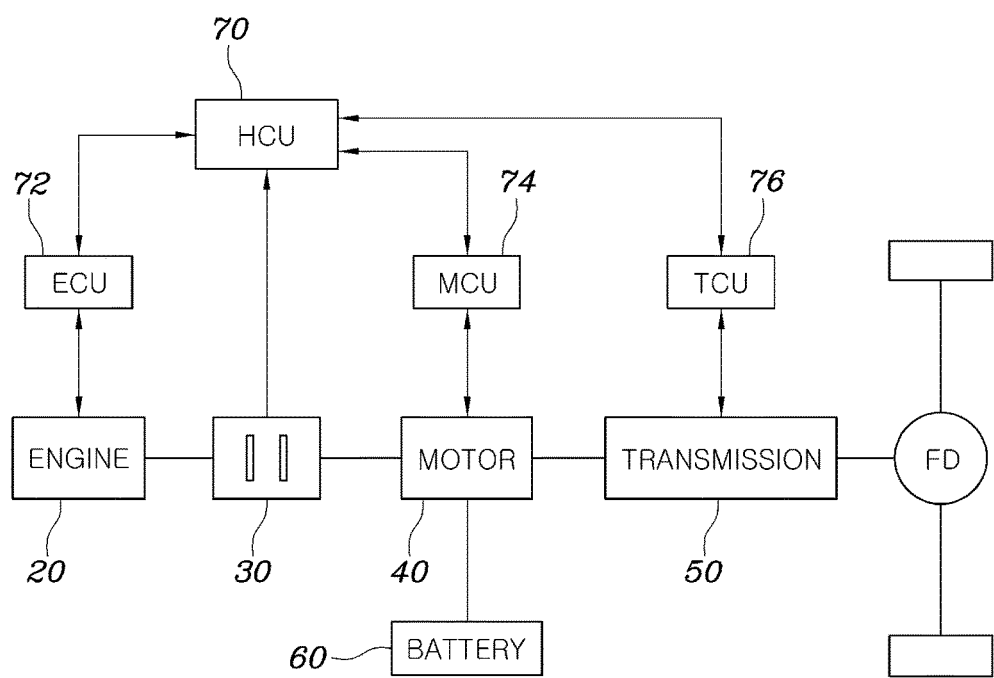
FIG. 2 is a schematic diagram illustrating a configuration of a general hybrid system to which the method for controlling a torque intervention of a hybrid vehicle according to exemplary embodiments of the present disclosure is applied.

A hybrid system of FIG. 2 is illustrated as an example for convenience of explanation. Therefore, a method for controlling a torque intervention of a hybrid vehicle according to exemplary embodiments of the present disclosure when the vehicle is shifted may be applied to the hybrid system of FIG. 2 as well as all other hybrid systems.

As illustrated in FIG. 2, the hybrid system to which the exemplary embodiment of the present disclosure is applied may include a hybrid control unit HCU or a hybrid controller 70, an engine control unit ECU or an engine controller 72, a motor control unit MCU or a motor controller 74, a transmission control unit or a transmission controller TCU 76, an engine 20, an engine clutch 30, a motor 40, a transmission 50 and a battery 60.

The HCU 70 is a top controller that controls a driving of other controllers, sets a hybrid driving mode, and controls a general operation of the hybrid vehicle and integrally controls lower controllers connected to a network to control output torques of the engine 20 and the motor 40.

The ECU 72 controls a general operation of the engine 20 depending on a requested torque signal of a driver, cooling water temperature, and engine state information on an engine torque, or the like.

The MCU 74 controls a general operation of the motor 40 depending on the requested torque signal of the driver, the driving mode of the hybrid vehicle, and an SOC state of the battery 60.

The TCU 76 controls a general operation of a transmission 26 that controls a shift ratio depending on each output torque of the ECU 72 and the MCU 74, determines regenerative braking operations, or the like.

The engine 20 is a power source and outputs power after an ignition on state.

The engine clutch is disposed between the engine 20 and the motor 40 to receive the control signal of the HCU 70 to thereby selectively connect between the engine 20 and the motor 40 depending on the driving mode of the hybrid vehicle.

The motor 40 is operated by a three-phase alternating voltage applied from the battery 60 through an inverter to generate a torque and is operated as a power generator during vehicle coasting to supply regenerative energy to the battery 60.

The transmission 50 is supplied with a sum of the output torque of the engine 20 and the output torque of the motor 40 determined based on an engagement and a release of the engine clutch 30 as an input torque and any shift stage is selected depending on a vehicle speed and a driving condition to output a driving force to a driving wheel, thereby maintaining driving.

The battery 60 is formed from a plurality of unit cells and stored with, or at, a high voltage for providing a voltage to the motor 40, for example, a direct voltage of 400 V to 450 V.

The hybrid system in addition to the foregoing is generally widely known to those skilled in the art, and therefore a detailed description of each configuration will be omitted.

Figure 3:
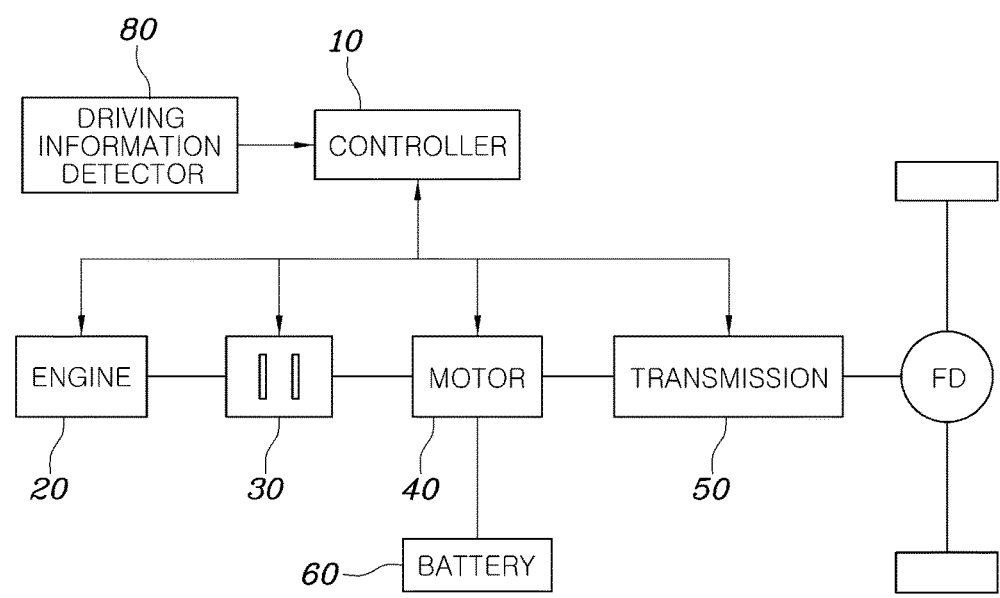
FIG. 3 is a diagram schematically illustrating a configuration of an apparatus for controlling a torque intervention of the hybrid vehicle of FIG. 2.

As illustrated in FIG. 3, an apparatus for controlling a torque intervention of a hybrid vehicle according to exemplary embodiments of the present disclosure includes a driving information detector 80, the engine 20, the engine clutch 30, the motor 40, the transmission 50 and a controller 10.

Some processes of the method for controlling a torque intervention of a hybrid vehicle according to exemplary embodiments of the present disclosure may be performed by the ECU 72 and the MCU 74 and some other processors may be performed by the HCU 70. Therefore, in exemplary embodiments of the present disclosure, the ECU 72, the MCU 74, and the HCU may be described as one controller 10, and therefore, unless specially mentioned in the present specification and claims for convenience for explanation, the ECU 72, the MCU 74, and the HCU 70 shall be termed the controller 10.

The hybrid vehicle to which the exemplary embodiments of the present disclosure are applied includes at least one engine 20 and at least one motor 40. Further, the hybrid vehicle provides a driving mode that separately or simultaneously operates or the engine 20 and the motor 40 as the power source. For this purpose, the engine clutch 30 that is a power transfer apparatus transferring or intermitting the power of the engine to the wheel is connected to the engine 20 and the motor 40.

The driving information detector 80 may include a vehicle speed sensor for detecting a vehicle speed of the hybrid vehicle, a motor speed sensor for detecting a speed of the motor, an engine speed sensor for detecting a speed of the engine, an accelerator pedal position sensor for detecting a position value of an accelerator pedal, and a brake pedal position sensor for detecting a position value of a brake pedal.

Further, the driving information detector 80 detects the request of the torque intervention of the hybrid vehicle from the engine speed, the motor speed, the position of the accelerator pedal and the position of the brake pedal, and transfers a signal corresponding to the request to the controller 10.

Figure 4:
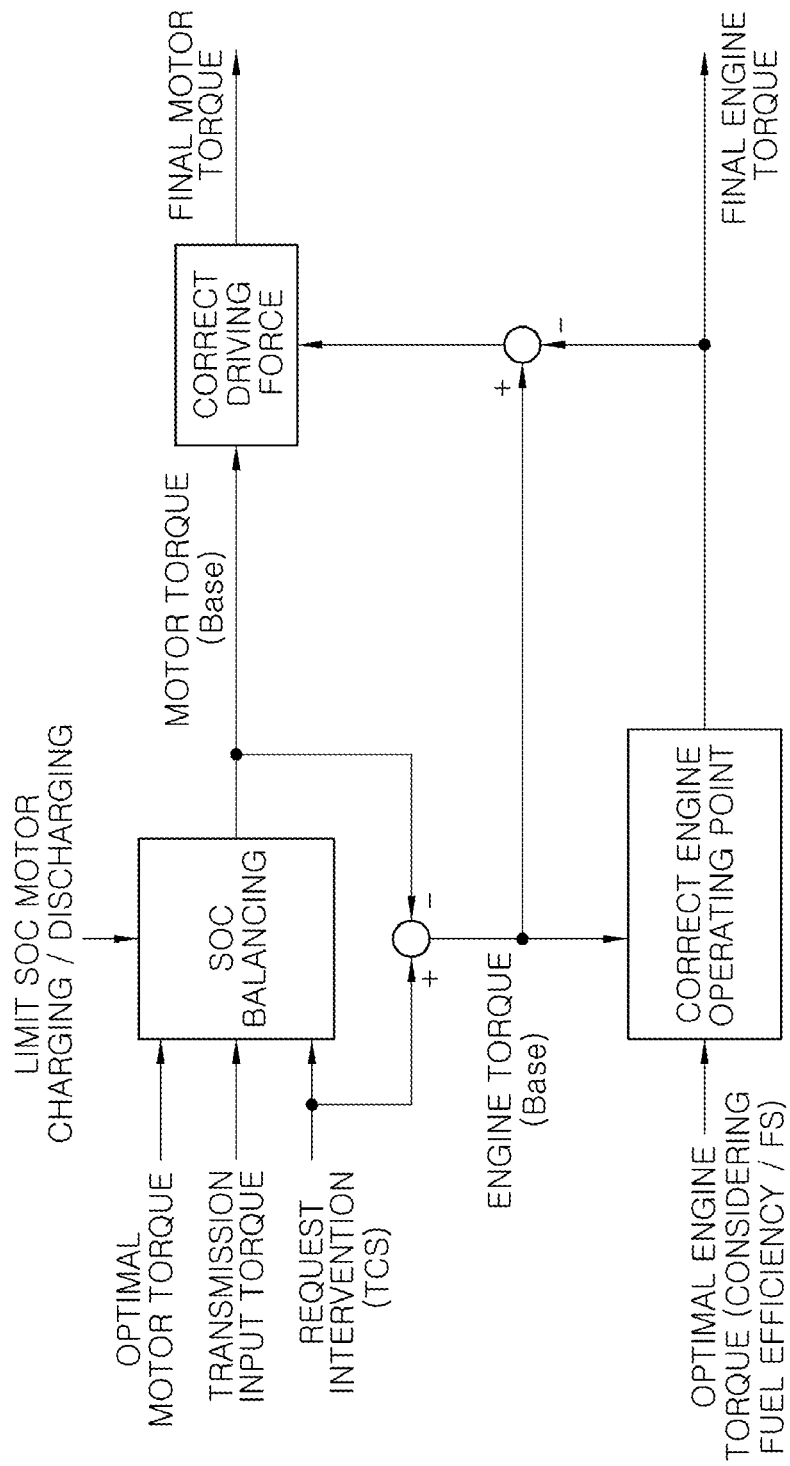
FIG. 4 is a diagram illustrating a control instruction to perform a torque intervention according to exemplary embodiments of the present disclosure.

FIG. 4 is a diagram illustrating a control instruction to perform a torque intervention according to exemplary embodiments of the present disclosure. As illustrated in FIG. 4, when the torque intervention for controlling the driving force of the hybrid vehicle is requested, the controller 10 controls the driving force when the wheel slip is generated to reduce the torque for securing driving stability.

In more detail, the controller 10 derives a target motor torque and a target engine torque depending on a required torque variation when the torque intervention is requested, in which the target motor torque is derived so that a high voltage battery does not deviate from an SOC charging and discharging limit, limits the target engine torque to be equal to or less than a target engine torque before the intervention request to obtain a final engine torque, and corrects the target motor torque to a final motor torque depending on the final engine torque.

The controller 10 first derives the target motor torque in consideration of the SOC state of the high voltage battery. Here, the controller limits the SOC charging and discharging limit of the high voltage battery to be a first set torque when the SOC of the high voltage battery is equal to or less than a first reference value and limits the SOC charging and discharging limit to be a second set torque when the SOC of the high voltage battery is equal to or more than a second reference value.

In other words, the controller 10 sets the value of the derived target motor torque to be limited when the SOC state of the high voltage battery is equal to or greater than a predetermined level to prevent the SOC of the battery from overcharging and sets the value thereof to be limited when the SOC state of the high voltage battery is equal to or less than the predetermined level to prevent the SOC of the battery from overdischarging.

The controller 10 calculates a difference of the torque variation from the target motor torque before the intervention to derive the target motor torque, in the calculation of the target motor torque depending on the SOC charging and discharging limitation of the high voltage battery.

Here, the target motor torque before the intervention means the optimal target motor torque before the wheel slip is generated and the torque variation means a difference value of the transmission input torque from the intervention requested torque. For example, when the intervention requested torque is 100 and the transmission input torque is 50, 100−50=50 becomes the difference value. In this case, the difference value may also be the torque reduction and the torque variation.

The controller 10 derives the target engine torque by calculating a difference of the target motor torque from the intervention requested torque. That is, the difference of the derived target motor torque from the intervention requested torque value is obtained. Therefore, the controller 10 distributes the intervention requested torque to the engine and the motor by deriving the target engine torque based on the difference between the target motor torque and the intervention requested torque. Further, the derived target engine torque again corrects the engine operating point by the controller. This may exceed the optimal engine torque calculated before the intervention when the engine torque is determined based on the SOC balancing of the high voltage battery. Therefore, in this case, the fuel efficiency is considerably worse, and therefore the target engine torque is limited to exceed the target engine torque before the intervention to obtain the final engine torque.

The controller 10 corrects the engine operating point to the final engine torque and then corrects the final driving force by the motor to meet the intervention requested torque. In this case, the correction of the driving force by the motor does not exceed a range of a maximum output possible torque of the motor.

In more detail, the controller calculates the difference of the final engine torque from a sum of the target motor torque and the target engine torque to obtain the final motor torque. That is, the final motor torque is obtained by obtaining the sum of the calculated target motor torque and target engine torque and then again obtaining the difference of the final engine torque and correcting the engine operating point therefrom. In this case, the controller limits the final motor torque to be in the range from a minimum output motor torque to a maximum output motor torque to correct the final driving force.

For this purpose, the controller 10 may be implemented by at least one processor operated by a set program, in which the set program may be programmed to perform each step of the method for controlling a torque intervention of a hybrid vehicle according to exemplary embodiments of the present disclosure.

Hereinafter, referring to FIG. 5, a method for controlling a torque intervention of a hybrid vehicle upon the shift according to exemplary embodiments of the present disclosure will be described in detail.

Figure 5:
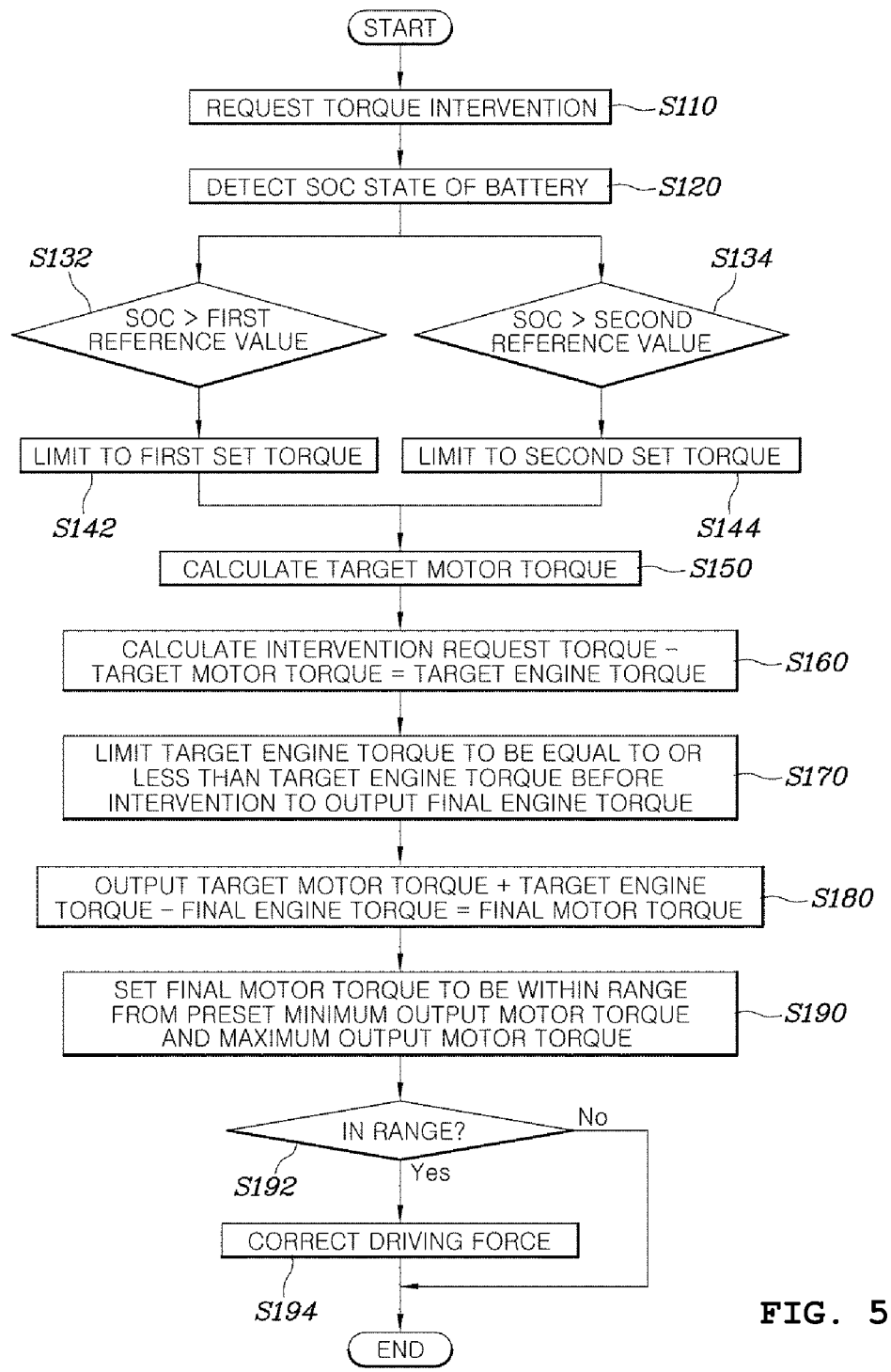
FIG. 5 is a flowchart of a method for controlling a torque intervention of a hybrid vehicle according to exemplary embodiments of the present disclosure.

FIG. 5 is a flowchart of a method for controlling a torque intervention of a hybrid vehicle according to exemplary embodiments of the present disclosure.

As illustrated in FIG. 5, the method for controlling a torque intervention of a hybrid vehicle according to exemplary embodiments of the present disclosure performs detecting the torque intervention request of the hybrid vehicle (S110). Here, the driving information detector 80 detects the request of the torque intervention of the hybrid vehicle from the engine speed, the motor speed, the position of the accelerator pedal and the position of the brake pedal, and transfers a signal corresponding to the request to the controller 10.

Next, the target motor torque is derived (S150) in consideration of the SOC state of the high voltage battery (S120). Here, the controller limits the SOC charging and discharging limit of the high voltage battery to be a first set torque (S142) when the SOC of the high voltage battery is equal to or less than a first reference value (S132) and limits the SOC charging and discharging limit to a second set torque (S144) when the SOC of the high voltage battery is equal to or greater than a second reference value (S134).

In other words, the controller 10 sets the value of the derived target motor torque to be limited when the SOC state of the high voltage battery is equal to or greater than a predetermined level (S150) to prevent the SOC of the battery from overcharging and sets the value thereof to be limited when the SOC state of the high voltage battery is equal to or less than the predetermined level to prevent the battery from overdischarging.

Further, the target motor torque is calculated depending on the SOC charging and discharging limitation of the high voltage battery during the process of driving the target motor torque and the target motor torque is obtained by calculating the difference of the torque variation from the target motor torque before the intervention. Here, the target motor torque before the intervention means the optimal target motor torque before the wheel slip is generated and the torque variation means a difference value of the transmission input torque from the intervention requested torque. For example, when the intervention requested torque is 100 and the transmission input torque is 50, 100−50=50 becomes the difference value. In this case, the difference value may also be the torque reduction and the torque variation.

Next, the step of obtaining the target engine torque by calculating the difference of the target motor torque from the intervention requested torque is performed (S160).

In more detail, the controller 10 obtains the difference of the derived target motor torque from the intervention requested torque value. That is, the target engine torque value for performing power distribution based on a torque amount to be controlled in each of the target motor torque and the target engine torque is derived.

Further, the step of obtaining the final engine torque by limiting the target engine torque to be equal to or less than the target engine torque before the intervention request is performed (S170). Here, the derived target engine torque again corrects the engine operating point by the controller. This may exceed the optimal engine torque calculated before the intervention when the engine torque is determined based on the SOC balancing of the high voltage battery. Therefore, in this case, the fuel efficiency is considerably worse, and therefore the target engine torque is limited to exceed the target engine torque before the intervention to obtain the final engine torque.

Next, after the engine operating point is corrected using the final engine torque, the final motor torque is calculated (S180) to correct the final driving force (S190).

In more detail, the controller calculates the difference of the final engine torque from a sum of the target motor torque and the target engine torque to obtain the final motor torque (S180). That is, the final motor torque is obtained by obtaining the sum of the calculated target motor torque and target engine torque and then again calculating the difference of the final engine torque correcting the engine operating point therefrom.

In this case, the controller limits the final motor torque to be in the range from a minimum output motor torque to a maximum output motor torque (S192) to correct the final driving force (S194). In more detail, the controller 10 corrects the final driving force by the motor to meet the intervention requested torque.

Figure 6:
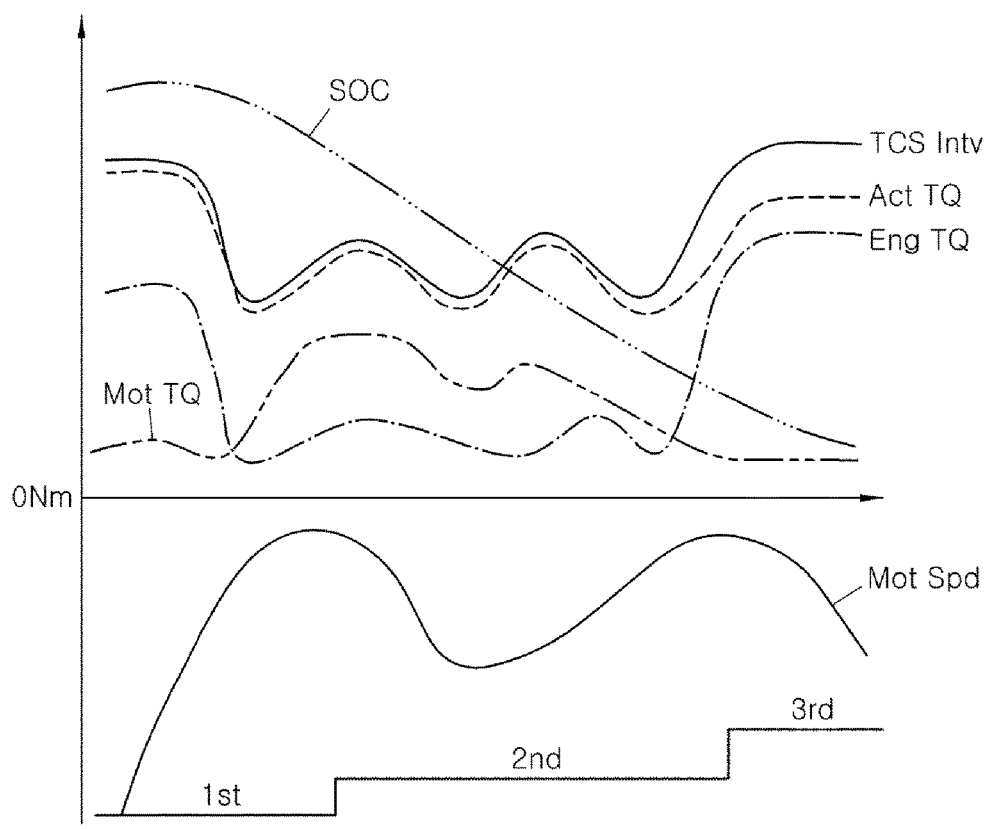
FIG. 6 is a diagram illustrating torque and SOC state values of a battery in the case of a priority allocation control of a motor torque of the torque intervention according to the related art.
Figure 7:
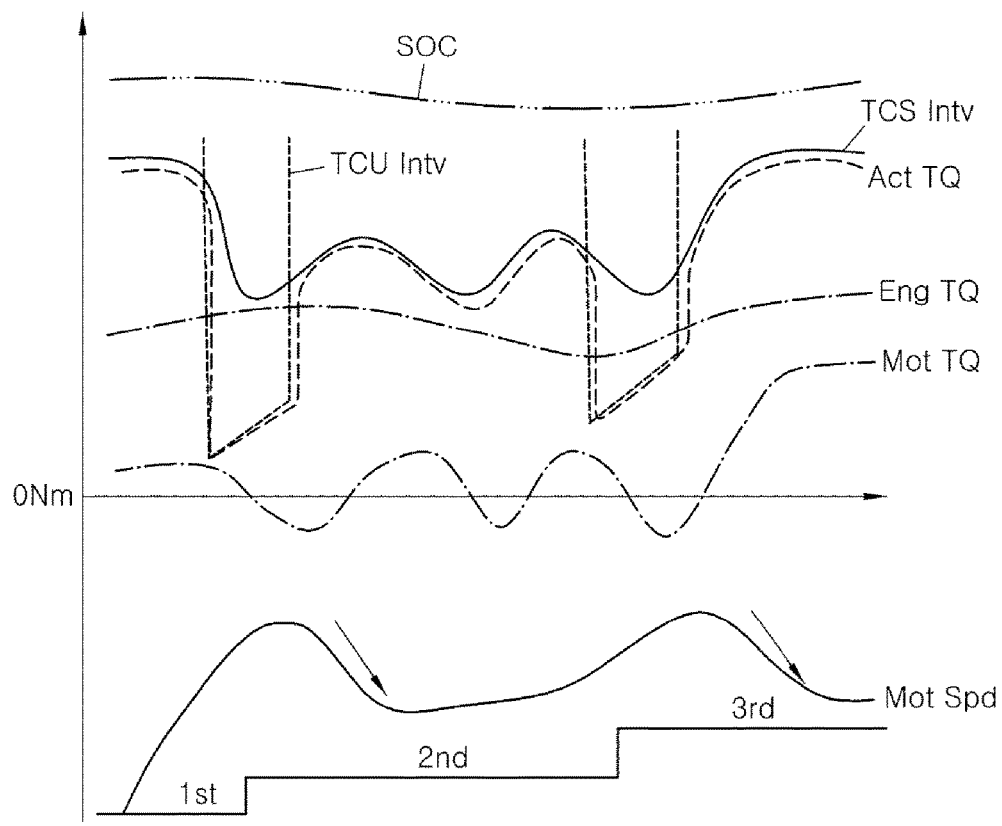
FIG. 7 is a diagram illustrating torque and SOC state values of a battery in the case of an SOC balancing priority allocation control of the torque intervention according to exemplary embodiments of the present disclosure.

FIG. 6 is a diagram illustrating each torque and an SOC state value of a battery in the case of a priority allocation control of a motor torque of the torque intervention according to the related art. FIG. 7 is a diagram illustrating each torque and an SOC state value of a battery in the case of a battery SOC balancing priority allocation control of the torque intervention according to exemplary embodiments of the present disclosure.

As illustrated in FIG. 6, when the TCS intervention is requested, the SOC balancing depending on the motor speed, the engine torque, the motor torque, and the output of the transmission input torque are shown and when the priority allocation control of the motor torque is performed, torque followability, or trackability, may be improved or the reduction in engine connection may be good but when the TCS is continuously operated, the situation that the SOC of the battery overdischarges is shown. This may adversely affect the torque followability and the reduction in engine connection due to the overdischarging of the SOC. On the other hand, as illustrated in FIG. 7, when the motor torque and the engine torque are corrected in consideration of the SOC of the battery, the sudden reduction in the SOC is improved and the maximum intervention priority control is applied during the TCS shift to improve the stability of the TCS shift and the sense of delay. Therefore, it can be appreciated that the SOC may be maintained during the operation of the TCS and the torque followability may be improved, compared to the related art.

According to exemplary embodiments of the present disclosure, it is possible to stably maintain the SOC balancing of the battery while operating the engine at the optimal operating point in performing the TCS torque intervention for wheel slip prevention when the road surface is in the slippery state.

The scope of the present disclosure is not limited to the foregoing embodiments and therefore the embodiments of the present disclosure may be variously implemented within the appended claims. It is to be noted that embodiments that may be variously changed by those skilled in the art without deviating from the subject matter of the present disclosure claimed in the appended claims are within the scope of the appended claims.

What is claimed is:

1. An apparatus for controlling a torque intervention of a hybrid vehicle, comprising:
    a driving information detector for detecting a torque intervention request of the hybrid vehicle; and
    a controller for deriving a target motor torque and a target engine torque depending on a required torque variation when the torque intervention is requested, the target motor torque being derived so that a high voltage battery does not deviate from a state of charge (SOC) charging and discharging limit, the target motor torque limiting the target engine torque to be equal to or less than a target engine torque before the intervention request to obtain a final engine torque, and the target motor torque correcting the target motor torque to a final motor torque depending on the final engine torque.

2. The apparatus of claim 1, wherein the controller limits the SOC charging and discharging limit of the high voltage battery to be a first set torque when the SOC of the high voltage battery is equal to or less than a first reference value and limits the SOC charging and discharging limit to be a second set torque when the SOC of the high voltage battery is equal to or greater than a second reference value.

3. The apparatus of claim 1, wherein the controller calculates a difference of a torque variation from the target motor torque before the intervention to derive the target motor torque, wherein a calculation of the target motor torque depends on the SOC charging and discharging limit of the high voltage battery.

4. The apparatus of claim 3, wherein the torque variation is a difference value of a transmission input torque from an intervention requested torque.

5. The apparatus of claim 1, wherein the controller obtains the target engine torque by calculating a difference of the target motor torque from an intervention requested torque.

6. The apparatus of claim 1, wherein the final motor torque is obtained by calculating a difference of the final engine torque from a sum of the target motor torque and the target engine torque.

7. The apparatus of claim 1, wherein the controller limits the final motor torque to be within a range from a minimum output motor torque to a maximum output motor torque.

8. A method for controlling a torque intervention of a hybrid vehicle, the method comprising:
    detecting, by a driving information detector, a torque intervention request of the hybrid vehicle;
    deriving, by a controller, a target motor torque and a target engine torque depending on a required torque variation when the torque intervention is requested, the target motor torque being derived so that a high voltage battery does not deviate from an SOC charging and discharging limit;
    obtaining, by the controller, a final engine torque by limiting the target engine torque to be equal to or less than the target engine torque before the intervention request; and
    correcting, by the controller, the target motor torque to a final motor torque depending on the final engine torque.

9. The method of claim 8, wherein the controller limits the SOC charging and discharging limit of the high voltage battery to be a first set torque when the SOC of the high voltage battery is equal to or less than a first reference value and limits the SOC charging and discharging limit to be a second set torque when the SOC of the high voltage battery is equal to or greater than a second reference value.

10. The method of claim 8, wherein the controller calculates a difference of a torque variation from the target motor torque before the intervention to derive the target motor torque, in a calculation of the target motor torque depending on the SOC charging and discharging limit of the high voltage battery.

11. The method of claim 10, wherein the torque variation is a difference value of a transmission input torque from an intervention requested torque.

12. The method of claim 8, wherein the controller obtains the target engine torque by calculating a difference of the target motor torque from an intervention requested torque.

13. The method of claim 8, wherein the final motor torque is obtained by calculating a difference of the final engine torque from a sum of the target motor torque and the target engine torque.

14. The method of claim 8, wherein the controller limits the final motor torque to be within a range from a minimum output motor torque to a maximum output motor torque.

* * * * *